July 13, 1954  H. G. WARREN  2,683,614

VACUUM ACTUATED SEAL FOR EVACUATING MECHANISM

Filed Dec. 8, 1951

HORACE G. WARREN
INVENTOR.

BY
ATTORNEYS

Patented July 13, 1954

2,683,614

UNITED STATES PATENT OFFICE 2,683,614

VACUUM ACTUATED SEAL FOR EVACUATING MECHANISM

Horace G. Warren, Rochester, N. Y., assignor, by mesne assignments, to Consolidated Vacuum Corporation, Rochester, N. Y., a corporation of New York Application December 8, 1951, Serial No. 260,611

5 Claims. (Cl. 285—165)

1

This invention relates to vacuum heads for use on evacuating apparatus and is particularly concerned with a vacuum-actuated exhaust head for use in exhausting vacuum tubes and the like.

The evacuation of hollow articles such as electronic tubes, X-ray tubes, cathode ray tubes and similar articles requires some means for connecting a neck portion of the article to be evacuated to the vacuum pumping system. In the case of glass articles, this has been done in some cases by actually fusing the neck of the tube to a glass tubulation on an exhaust manifold which, of course, requires a glass blowing operation. An alternative method which has been employed was to force the neck of the article to be evacuated into an opening in a rubber packing. This necessitated the fire polishing of the necks of glass articles in order to avoid scoring the packing, or else frequent changes of packing. Furthermore after the evacuated article was tipped off, it was difficult to remove the stem stub from the packing. Various other expedients were employed but the problem remained of providing a port ensuring a positive seal during evacuation but permitting ready insertion and removal of the stem or neck of the article being evacuated.

It is accordingly an object of this invention to provide an improved vacuum head for use with exhausting equipment.

It is a further object of this invention to provide a new vacuum head which is actuated by the vacuum in the system.

It is also an object of this invention to provide a simple but effective port assembly which ensures positive sealing action during evacuation but which is constructed to permit ready loading and unloading of articles to be evacuated.

It is a particular object of this invention to provide an inverted vacuum port constructed so that the neck stub remaining in the port after tip-off drops out by gravity.

Another object of the invention is to provide improved port apparatus on vacuum head assemblies wherein the sealing of the port around the neck or stem of the article being evacuated is directly correlated to the pressure in the vacuum head chamber.

Another object of the invention is to facilitate the evacuation of hollow articles.

Other objects will be apparent from the description and claims which follow.

These and other objects are attained by apparatus embodying this invention as described more fully hereinafter with reference to certain preferred embodiments illustrated in the drawings.

2

Figure 1:
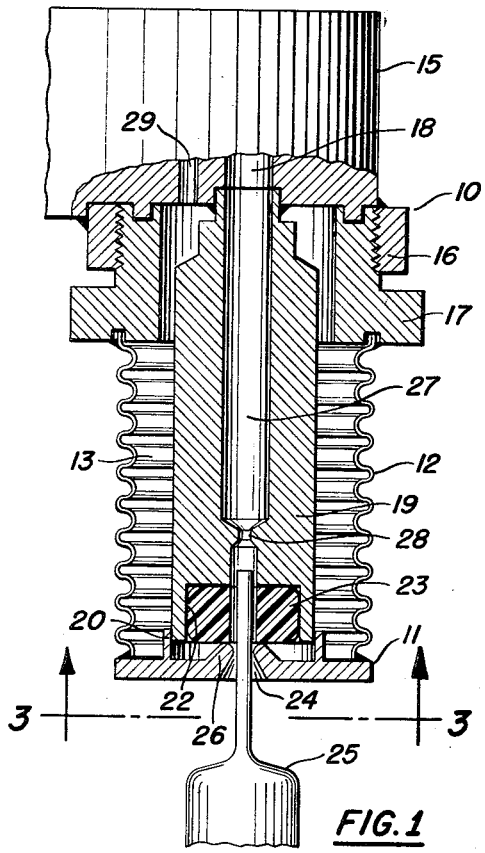
Fig. 1 is a view in elevation, partly broken away and in section, of a preferred vacuum head embodying the invention, the port being shown in the open position.

Referring to the drawings, the vacuum head constituting a preferred embodiment of the invention comprises a fixed base member 10, a movable metal end plate 11 and a contractile bellows 12 combining to form an evacuable chamber 13.

In the preferred embodiment shown in the drawings, fixed base member 10 comprises a metal block 15 which can be mounted on suitable vacuum exhausting apparatus, an internally threaded annular base flange 16 welded to block 15 and dependent therefrom, and a mating base plate 17 screwed into flange 16. Block 15 is bored to provide an exhaust outlet 18 for evacuating an article in the port and a second exhaust outlet 29 for evacuating chamber 13, block 15 being provided with suitable valved connections (not shown) for connecting exhaust outlets 18 and 29 to a suitable vacuum pumping system (not shown). Outlets 18 and 29 can be branch conduits from a single main conduit; but in the preferred apparatus, outlets 18 and 29 are separately connected to a source of vacuum for selective evacuation.

The upper end of bellows 12 is welded or otherwise secured to base plate 17 with the bellows depending from plate 17. The lower end of bellows 12 is closed by movable plate 11 welded to bellows 12.

A rigid metal core 19 is mounted inside chamber 13 with the upper end of core 19 welded to block 15, base plate 17 being bored to accommodate core 19 and provide a vacuum passage from the interior of bellows 12 to outlet 29. The lower end of core 19 is journalled in an upwardly directed annular flange 20 on movable plate 11. Countersunk hole 22 in the lower end of core 19 facing movable plate 11 seats and confines sealing member 23 which is formed of rubber or other suitable resilient material.

Figure 2:
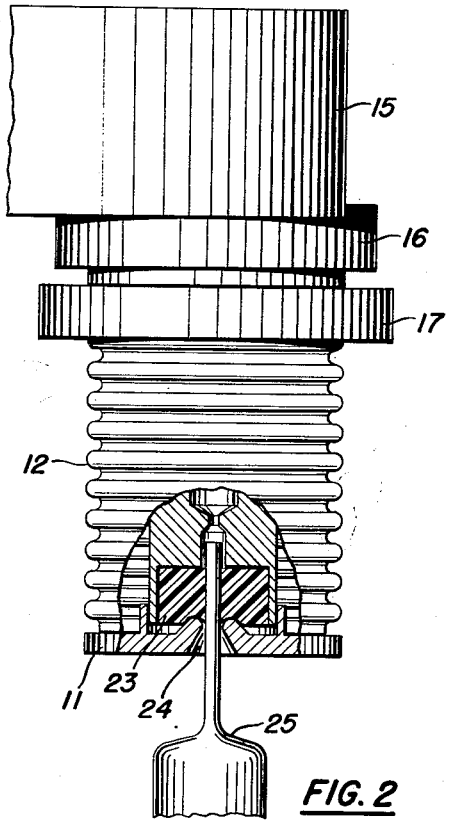
Fig. 2 is a view in elevation, partly broken away and in section, of the preferred embodiment illustrated in Fig. 1, the port being shown in closed position.
Figure 3:
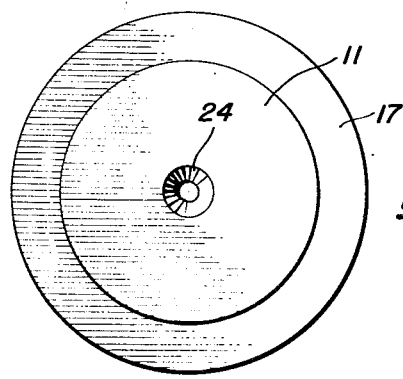
Fig. 3 is a view taken along line 3—3 of Fig. 1.

A port opening 24 through movable plate 11 and sealing member 23 serves to receive a neck or stem portion of an article to be evacuated, a vacuum tube blank being shown in Figs. 1 and 2 and designated by the numeral 25. Opening 24 through plate 11 is desirably funnel shaped to facilitate loading of the port. The upwardly deformed margin 26 of plate 11 around opening 24 abuts against sealing member 23; bellows 12, core 19 and sealing member 23 being so dimensioned that sealing member 23 is uncompressed by but in contact with margin 26 when bellows 12 is fully extended.

Internal bore 27 through core 19 connects port opening 24 with exhaust outlet 18. Desirably, bore 27 is constricted at 28 to limit entrance of the tube stem into the port to a predetermined distance.

In operating the preferred apparatus illustrated in the drawings, exhaust outlets 18 and 29 are connected to a suitable vacuum pumping system. With the interior of the assembly on exhaust head at atmospheric pressure, the bellows is fully extended by sealing member 23 which normally assumes the uncompressed condition as shown in Fig. 1 and which has sufficient resiliency to maintain the bellows extended and the port open. The neck or stem of an article to be evacuated, such as tube blank 25, is inserted into port opening 24 and extending through sealing member 23, constriction 28 serving as a guide for insertion to the proper distance. The vacuum pumps are then switched on, or, if continuously operating, are connected into exhaust outlet 29 by suitable valving means, and evacuation of chamber 13 begins. As the pressure in chamber 13 is reduced, bellows 12 begins to contract and pulls plate 11 inwardly against sealing member 23. Sealing member 23 is compressed between core 19 and plate 11 by projecting margin 26; and, being confined within seat 22, seals tightly around the neck of the tube as shown in Fig. 2. Increasing vacuum causes tighter sealing since the contraction of bellows 12 is dependent upon the degree of vacuum. Core 19 limits the movement of plate 11 to a predetermined distance so that the compression of sealing member 23 does not cause breakage or collapse of the tube neck. With the neck of the article sealed in the port, outlet 18 is opened to the pumping system and the article is evacuated through bore 27 in core 19.

In usual practice, the port is maintained in closed position until the tube or similar article being evacuated reaches the desired degree of evacuation at which time the tube is tipped off leaving a stub in the port. The vacuum pumping system is then cut out and air admitted to the chamber 13 through outlet 29. As soon as the pressure is equalized, bellows 12 is extended by sealing member 23 resuming the uncompressed condition, and the neck stub drops out of the port.

The operation of the port is dependent upon the vacuum in the system and the operator need only load the port and connect the vacuum head to the vacuum pumping system. In automatic equipment where evacuation occurs in predetermined zones of the cycle and is automatically discontinued just before the loading station, the operator needs only to load the port with no delay to remove the tip-off stubs.

Thus by means of this invention, evacuation of hollow articles is facilitated by apparatus of simple construction not readily subject to mechanical failure. Operation of the port is correlated to the vacuum in the system and is not dependent on auxiliary switches or other means subject to failure. The vacuum head embodying the invention is readily disassembled for repair, cleaning or replacement of parts by merely unscrewing base plate 17 from flange 16.

While the invention has been described in considerable detail with reference to a preferred embodiment thereof as illustrated in the drawings, it will be understood that variations and modifications can be effected within the spirit and scope of the invention as illustrated in the drawings, as described hereinabove and as defined in the appended claims.

I claim:

1. A vacuum head comprising fixed end wall means, movable end wall means and contractile side wall means defining a compressible chamber adapted to be evacuated, resilient sealing means mounted in said chamber contiguous to said movable means and positioned to be compressed by inward movement of said movable means, a port opening through said movable means and said sealing means and being adapted to receive a neck portion of an article to be evacuated, and exhaust outlet means including an exhaust outlet through said fixed means communicating with said port opening and an exhaust outlet through said fixed means for evacuating said chamber, said side wall means being contractible upon evacuation of said chamber.

2. A vacuum head comprising fixed end wall means, movable end wall means and contractile side wall means defining a compressible chamber adapted to be evacuated, resilient sealing means mounted in said chamber contiguous to said movable means and being arranged to be compressed by inward movement of said movable means, means for preventing movement of said sealing means toward said fixed means, a port opening through said movable means and said sealing means for receiving the neck portion of an article to be evacuated, and exhaust outlet means through said fixed means for communicating with said port opening and said chamber, said side wall means being contractible upon evacuation of said chamber.

3. A vacuum head comprising a fixed base member, a movable end plate, and a contractile bellows combining to form an evacuable chamber, a rigid core within said chamber, one end of said core being secured to said fixed member, the other end of said core being adjacent to but spaced from said movable plate, a resilient sealing member disposed between said core and said movable plate and being arranged to be compressed between said core and said movable plate by movement of said movable plate toward said fixed member, a port opening through said movable plate and said sealing member for receiving a neck portion of an article to be evacuated, an exhaust outlet through said fixed member for evacuating said chamber, and a bore through said core connecting said port opening with said exhaust outlet, said bellows being adapted to contract upon evacuation of said chamber.

4. A vacuum head comprising a fixed base member, a movable end plate and a contractile bellows combining to form an evacuable chamber, a rigid core mounted within said chamber, one end of said core being secured to said fixed member, the unsecured end of said core being adjacent to but spaced from said movable plate, said unsecured end of said core having a countersunk seat therein facing said movable plate and being adapted to receive a sealing member, a resilient sealing member positioned in said countersunk seat and arranged to be compressed between said core and said movable plate by movement of said movable plate toward said fixed base member, a port opening extending through said movable plate and said sealing member and being adapted to receive a neck portion of an article to be evacuated, an exhaust outlet through said fixed base member for evacuating said chamber, and a bore through said core connecting said port opening with said exhaust outlet, said bellows being adapted to contract during evacuation of said chamber.

5. A vacuum head comprising a fixed base member, a movable end plate, a contractile bellows disposed between said fixed member and said movable plate, one end of said bellows being secured to said fixed base member, the other end of said bellows being secured to said movable plate, said fixed base member, movable plate and contractile bellows combining to form an evacuable chamber, an inwardly directed annular flange on said movable plate and within said bellows, a rigid core within said chamber and partially filling said chamber, one end of said core being secured to said fixed base member, the other end of said core being journalled in said annular flange and adjacent to said movable plate, a countersunk seat in said end of said core adjacent said movable plate, a resilient sealing member disposed in said seat and facing said movable plate, said sealing member being arranged to be compressed between said core and said movable plate by inward movement of said movable plate towards said fixed base member, a port opening through said movable plate and said sealing member for receiving a neck portion of an article to be evacuated, an exhaust outlet through said fixed base member for evacuating said chamber, a second exhaust outlet through said fixed base member, and a bore through said core connecting said port opening and said second exhaust outlet, said bellows being adapted to contract upon evacuating said chamber.

No references cited.